(12) United States Patent
Rust

(10) Patent No.: US 8,028,783 B2
(45) Date of Patent: Oct. 4, 2011

(54) TILT APPARATUS AND METHOD FOR OPERATING IT

(76) Inventor: Felix Edward Joseph Rust, Katikati (NZ)

(*) Notice: Subject to any disclaimer, the term of this patent is extended or adjusted under 35 U.S.C. 154(b) by 274 days.

(21) Appl. No.: 12/375,228

(22) PCT Filed: Jul. 23, 2007

(86) PCT No.: PCT/NZ2007/000194
§ 371 (c)(1),
(2), (4) Date: Jan. 27, 2009

(87) PCT Pub. No.: WO2008/016310
PCT Pub. Date: Feb. 7, 2008

(65) Prior Publication Data
US 2009/0314566 A1 Dec. 24, 2009

(30) Foreign Application Priority Data
Jul. 31, 2006 (NZ) ........................ 548846

(51) Int. Cl.
B62D 33/067 (2006.01)
(52) U.S. Cl. ................... 180/89.14; 280/6.154
(58) Field of Classification Search ............... 280/89.14, 280/89.15, 6.154, 124.103; 296/190.01, 296/190.07; 180/89.14, 89.15
See application file for complete search history.

(56) References Cited

U.S. PATENT DOCUMENTS

| 3,689,090 | A | * | 9/1972 | Dunaevsky et al. | 180/41 |
|---|---|---|---|---|---|
| 4,650,017 | A | * | 3/1987 | Pelletier et al. | 180/9.1 |
| 4,679,803 | A | * | 7/1987 | Biller et al. | 180/9.23 |
| 5,079,706 | A | * | 1/1992 | Yamaguchi et al. | 701/23 |
| 5,337,847 | A | * | 8/1994 | Woods et al. | 180/9.52 |
| 5,988,654 | A | * | 11/1999 | Wix et al. | 280/6.15 |
| 6,105,699 | A | * | 8/2000 | Hinds | 180/89.14 |
| 6,158,539 | A | * | 12/2000 | Isley | 180/89.14 |
| 6,173,973 | B1 | * | 1/2001 | Robinson | 280/6.154 |
| 6,241,263 | B1 | * | 6/2001 | Hicks | 280/6.154 |
| 6,273,203 | B1 | * | 8/2001 | Paggi et al. | 180/89.13 |

(Continued)

FOREIGN PATENT DOCUMENTS
WO 99/01329 1/1999
(Continued)

*Primary Examiner* — Paul N Dickson
*Assistant Examiner* — Timothy Wilhelm
(74) *Attorney, Agent, or Firm* — Ladas & Parry LLP

(57) ABSTRACT

A tilt apparatus and method for operating it is disclosed. The tilt apparatus for a cab of a construction vehicle comprises a support frame attached to a chassis of said vehicle, the horizontal plane of said support frame being parallel to that of said chassis, a mounting attached to said cab and connected with said support frame, and configured so that the horizontal plane of said mounting can tilt about any direction of said chassis, at least one actuator having one end connected with said support frame and the other end connected with said mounting, and operating so as to tilt said mounting, at least two inclination sensors comprising at least one top sensor installed on said mounting and at least one bottom sensor installed on said support frame or said chassis and a CPU installed in said cab and receiving the continual slope information from said top and bottom sensors and controlling the operation of said actuator on the basis of said continual slope information and the relative tilted angle information between the horizontal plane of said mounting and that of said support frame or chassis. The tilt apparatus of the invention is able automatically to level the cab of vehicle whilst the vehicle is in transit.

12 Claims, 2 Drawing Sheets

U.S. PATENT DOCUMENTS

| | | | |
|---|---|---|---|
| 6,343,799 B1 * | 2/2002 | Moyer | 280/6.154 |
| 6,446,980 B1 * | 9/2002 | Kutscher et al. | 280/5.508 |
| 6,684,138 B1 * | 1/2004 | Friede et al. | 701/36 |
| 6,755,270 B2 * | 6/2004 | Saarinen | 180/89.13 |
| 7,083,013 B2 * | 8/2006 | Chuan | 180/41 |
| 7,198,125 B2 * | 4/2007 | Skelcher et al. | 180/89.13 |
| 7,464,997 B2 * | 12/2008 | Longley | 305/128 |
| 7,832,740 B2 * | 11/2010 | Kim et al. | 280/6.154 |
| 2005/0189730 A1 * | 9/2005 | White | 280/6.154 |
| 2009/0118913 A1 * | 5/2009 | O'Halloran et al. | 701/50 |

FOREIGN PATENT DOCUMENTS

| | | |
|---|---|---|
| WO | 02/46539 | 6/2002 |
| WO | 02/098720 | 12/2002 |

* cited by examiner

TILT APPARATUS AND METHOD FOR OPERATING IT

TECHNICAL FIELD

This invention relates to a tilt apparatus and method for operating it. In particular, this invention relates to a tilt apparatus for the cab of a construction vehicle.

BACKGROUND ART

In particular, this invention relates to a tilt apparatus for the cab of an excavator/digger. However this should not be seen as limiting as the present invention may be applied to the cabs of the other vehicles.

For ease of reference only, the vehicle will now be referred to as being an excavator.

Existing tilt apparatus for leveling the cab of an excavator all suffer from a number of drawbacks.

U.S. Pat. No. 4,679,803 (US'803) provides a tilt apparatus for a cab, but this unit due to its construction, needs to be fitted to a purpose built chassis and this cannot be retrofitted to existing excavators.

PCT/NZ1998/00092 (PCT'00092) is an earlier patent application by the present inventor and describes a tilt apparatus which is capable of being retrofitted to an excavator.

However, this tilt apparatus is not configured to allow for substantially continuous adjustment of the tilt apparatus as inclination sensors are not employed. Furthermore, this tilt apparatus does not have the ability to detect and display the relative position of the track chassis to the cab.

Moreover, the inventor has discovered that both the inventions described in US'803 and PCT'00092 do not provide a tilt apparatus capable of automatically tilt leveling the cab whilst the excavator is in transit. In particular, they do not provide any indication as to whether a slope is too steep for the unit to operate. Therefore, the units described in these patent specifications are within a short period of time, prone to mechanical failure if operated when in transit. This is because there is no control over the hydraulics of the tilt apparatus when approaching the edge of the stroke limit of a ram. Accordingly, on steep slopes outside the range of the tilt apparatus' ability to level the cab the rams do not slow down as they reach their limit.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents from part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

1. According to one aspect of the present invention there is provided a tilt apparatus for a cab of a construction vehicle, comprising: a support frame attached to a chassis of said vehicle, the horizontal plane of said support frame being parallel to that of said chassis; a mounting attached to said cab and connected with said support frame, and configured so that the horizontal plane of said mounting can tilt about any direction of said chassis; actuators having the one end connected with said support frame and the other end connected with said mounting, and operating so as to tilt said mounting; at least two inclination sensors comprising at least one top sensor installed on said mounting and at least one bottom sensor installed on said support frame or said chassis; and a CPU installed in said cab and receiving the continual slope information from said top and bottom sensors and controlling the operation of said actuators on the basis of said continual slope information and the relative tilted angle information between the horizontal plane of said mounting and that of said support frame or chassis.

According to a further aspect of the present invention there is provided a tilt apparatus for a cab of a vehicle, comprising: a support frame attached to a chassis of the vehicle and connected with a tilt frame, the horizontal plane of said support frame being parallel to that of said chassis; a mounting attached to said cab and connected with said tilt frame, and configured so that the horizontal plane of said mounting can tilt about any direction of said chassis; actuators respectively having the one end connected with said support frame and the other end connected with said mounting, and operating so as to tilt said mounting; at least two inclination sensors comprising at least one top sensor installed on said mounting and at least one bottom sensor installed on said support frame or said chassis; and a CPU installed in said cab and receiving the continual slope information from said top and bottom sensors and controlling the operation of said actuators on the basis of said continual slope information and the relative tilted angle information between the horizontal plane of said mounting and that of said support frame or chassis.

According to another further aspect of the present invention there is provided a tilt apparatus for a cab of a vehicle, comprising: a support frame attached to a chassis of the vehicle and connected with a tilt frame, the horizontal plane of said support frame being parallel to that of said chassis; a mounting attached to said cab and connected with said tilt frame, and configured so that the horizontal plane of said mounting can tilt about any direction of said chassis; actuators comprising at least one top actuator having the one end connected with said support frame and the other end connected with said tilt frame and at least one bottom actuator having the one end connected with said tilt frame and the other end connected with said mounting; at least two inclination sensors comprising at least one top sensor installed on said mounting and at least one bottom sensor installed on said support frame or said chassis; and a CPU installed in said cab and receiving the continual slope information from said top and bottom sensors and controlling the operation of said actuators on the basis of said continual slope information and the relative tilted angle information between the horizontal plane of said mounting and that of said support frame or chassis.

Furthermore, according to another aspect of the present invention there is provided a method of operating a tilt apparatus comprising: a support frame attached to a chassis of a construction vehicle, the horizontal plane of said support frame being parallel to that of said chassis; a mounting attached to a cab of said vehicle and connected with said support frame, and configured so that the horizontal plane of said mounting can tilt about any direction of said chassis; actuators having the one end connected with said support frame and the other end connected with said mounting; at least two inclination sensors comprising at least one top sensor installed on said mounting and at least one bottom sensor installed on said support frame or said chassis and a CPU installed in said cab, the method comprising the steps of:

a) sensing the slope gradients and slope directions of said mounting and said support frame or chassis by said top and bottom sensors;

b) receiving continually said slope information from said top and bottom sensors at said CPU;

c) calculating the relative tilted-angle and -direction information between the horizontal plane of said mounting and that of said support frame or chassis by said CPU;

d) determining the slope angle of the horizontal plane of said mounting being to tilt about that of said chassis;

e) controlling the operation of said actuators by said CPU on the basis of said determined slope angle; and thereafter f) operating said actuators so as to tilt said mounting to the extent of said determined slope angle.

In preferred embodiments, the d) step may be performed by said CPU according to set program or by manual setting of an operator. Also, the e) step may be performed by said CPU according to manual operating of an operator.

For ease of reference only, the vehicle may now generally be thought of as being an excavator.

In general the present invention may be used on vehicle cabs which can rotate with respect to the chassis of the vehicle.

Preferably, to allow for the cab to rotate in use the mounting has a rotatable joint member. For ease of reference only, the mounting having the rotatable joint member may now be referred to simply as the mounting.

In preferred embodiments, the cab of the vehicle is attached to the rotatable joint member and therefore the cab can rotate with respect to the chassis of the vehicle.

The rotatable joint member may come in a variety of different forms without limiting the scope of the present invention.

In preferred embodiments the rotatable joint member may be a slew bearing.

For ease of reference only the rotatable joint member will now be referred to as a slew bearing.

It is envisaged that the vehicle cab may be any cab which is not integral with the vehicle chassis, so that the orientation of the cab can be varied with respect to the vehicle chassis.

In preferred embodiments the vehicle cab may be that of an excavator.

For ease of reference only, the vehicle may be thought of being that of an excavator.

It is envisaged that the slew bearing mounting may take a variety of different forms.

In preferred embodiments, the slew bearing mounting may be in the form of a substantially ring shaped frame. However, this should not be seen as limiting the scope of the present invention.

For ease of reference only, the slew bearing mounting will now be referred to simply as the mounting.

The slew bearing may be connected to the mounting in a variety of different manners.

In some embodiments the slew bearing may be integrally formed as part of the mounting itself.

In preferred embodiments, the slew bearing may be attached to the mounting by way of welding or bolts. Other means of attachment may of course be used.

In preferred embodiments according to the present invention comprising the support frame attached to the chassis and the mounting connected with the support frame, the mounting may be hinge-connected with the support frame in ball-type hinged connection. The mounting may have the protrusion of ball-type or hemisphere-type and the support frame may have the recess of hemisphere shape. Also, the present invention comprises at least two actuators. In particular, the actuators may be three and be configured in regular triangle type around the position of the hinged connection. More particularly, the actuators may be four and be configured in regular rectangle type.

The tilting of the mounting about both the longitudinal and transverse axes of the vehicle in the horizontal plane, may be achieved in a variety of different ways.

In another preferred embodiments, the mounting swings at the first horizontal pivot axis passed through the tilt frame and the mounting frame, and the tilt frame swings at the second horizontal pivot axis passed through the support frame and the tilt frame. The first and second horizontal pivot axes are particularly perpendicular to each other when the pivot axes are viewed in plane view.

In some embodiments the support frame may be pivotally attached to the chassis of the vehicle as well as pivotally attached to the mounting. The pivotal attachments of the mounting to the support frame, and the support frame to the chassis, are along the respective longitudinal and horizontal axes of the vehicle.

In preferred embodiments, the mounting may be pivotally attached to a tilt frame. The tilt frame may be pivotally attached to a support frame which is connected to the chassis of the vehicle. The pivotal attachments of the mounting to the tilt frame, and the tilt frame to the support frame, again are along the respective longitudinal and transverse axes of the vehicle, as described above.

In addition, in preferred embodiments the tilt frame is substantially ring-shaped frame when the tilt frame is viewed in plan view. Also, the tilt frame shapes a U-type or concave-curve figure of which both end sides are widened outwardly when the tilt frame is viewed in front or/and back view, and the shape of the tilt frame viewed in left-side or/and right-side view is reverse to the shape viewed in front or/and back view.

In some preferred embodiments the one end of some actuators may respectively be connected at the bottoms of the U-type or concave-curve figure of the tilt frame, as described above, and the other end may respectively be connected at the mounting frame. Also, the one end of other actuators may respectively be connected at the ceilings of the reverse figure to the U-type or concave-curve figure of the tilt frame and the other end may respectively be connected at the support frame. The tilt frame also may have at least one cross strut, preferably at least a pair of cross struts, more preferably at least two pair of cross struts. The cross struts may preferably be installed at the bottom positions of the U-type or concave-curve figure of the tilt frame and/or at the ceiling positions of the n-type or convex-curve figure.

In some preferred embodiments the tilt frame may be connected to a load frame. The function of the load frame is to ensure the structural rigidity of the tilt frame is maintained, as this is the main load being structure for the weight of the cab.

In preferred embodiments both the tilt and load frames may be substantially ring shaped frames when viewed in plan view although other configurations are possible.

In other preferred embodiments the mounting and the support frame may be ring-shaped frames when viewed in plan view. Also, the mounting and the support frame may comprise at least one cross strut, preferably at least a pair of cross struts. The struts may ensure the structural rigidity of them.

The support frame may be connected to the track chassis of the vehicle in a variety of ways.

In some embodiments the support frame may be integrally formed with the track chassis of the vehicle.

In some other embodiments the actuators may be a motor assembly or motor assemblies.

However, other suitable actuators may also be employed without departing from the scope of the present invention.

For ease of reference only, the actuators will now in most instances be referred to as being hydraulic rams.

In preferred embodiments the hydraulic rams of the mounting and tilt frames respectively may be arranged in pairs so that each pair can respectively control the tilting of the mounting and tilt frame about their respective axes of rotation. Thus, this configuration allows for the effective tilting of the mounting in both the clockwise and anticlockwise direction with respect to both the longitudinal and transverse axes.

In general, the hydraulic fluid supply for the hydraulic rams may be sourced from the existing hydraulic fluid supply of the excavator. However, this should not be seen as limiting.

In preferred embodiments the CPU may control the hydraulic fluid supply to the hydraulic rams connected to both the mounting and tilt frame via action of solenoid vales. Thus, it is this arrangement which helps enable the cab to be maintained in a horizontal plane, or any other predetermined orientation, which may be selected by the operator of the excavator.

In preferred embodiments the support frame may be either bolted or welded to the chassis. Other ways of attaching the support frame may of course be used.

In other preferred embodiments the mounting may have a centre distribution joint member attached to the upper part of the mounting and able to be connected with the hole of the lower part of the cab. The centre distribution joint member houses cables connected between the top and bottom sensors and the CPU and lines connected to the actuators. The cables, lines, and etc. will pass through the centre distribution joint member.

In preferred embodiments the actuators connect with the mounting and/or the tilt frame and/or the support frame and/or the chassis, in hinged connections.

Furthermore, in the preferred embodiments the actuators are at least two. Preferably, the actuators may be two pairs, and the each pair oppositely locates at the longitudinal or transverse axes of said vehicle. When the one of each pair of the actuators pushes one side of the mounting, the other will pull the opposite side of it at the same time.

In some embodiments, to control the tilting of the mounting and tilt frame about their respective longitudinal and transverse axes, actuators may be attached to the mounting and tilt frames in positions that allow the actuators to tilt same.

In preferred embodiments the actuator may be hydraulic rams.

In some embodiments the actuators may be pneumatic rams.

However, it should be appreciated that other methods for controlling the hydraulic rams may be used without departing from the scope of the present invention.

In preferred embodiments the CPU may be connected to a graphic display apparatus suitably positioned for viewing by the operator of the excavator. In general the graphic display apparatus is located in the driving booth of the cab.

In other preferred embodiments the top and bottom sensors may comprise at least one two-axis inclination sensor, respectively. The top and bottom sensors may comprise at least two one-axis inclination sensors, respectively.

Also, in preferred embodiments the sensors may be installed on both the mounting and/or cab and the support frame and/or chassis of the vehicle.

In order for the present invention to be used to excavate a gradient, for example a 3° fall to the north, the cab may also include a compass or other direction sensor(s) to precisely indicate the direction in which the arm of the excavator is directed.

In preferred embodiments of the present invention there may also be provided a manual override system, so that the orientation of the cab can be fixed with respect to the chassis of the excavator. Such orientation fixing would allow the excavator to be operated in the same manner as a conventional excavator.

The inclination sensors may be any sensor capable of determining spatial orientation of an object to which the sensor is attached with respect to the horizontal or other reference point.

In preferred embodiments the inclination sensors may be either liquid filled or solid state inclination sensors.

The CPU (i.e. Central Processing Unit) may be any device which is capable of receiving and processing information in accordance with a set of recorded instructions. The CPU is generally in the form of a processor. In some embodiments where the processor does not have RAM or ROM this may be present on the same integrated circuit. Preferably, the processor has RAM and ROM.

In general the CPU may be the CPU that is present on the vehicle to which the tilt apparatus is attached.

The CPU may be suitably programmed to at least:
  process the data received from the sensor(s) on the mounting and the sensor(s) on the support frame or chassis; and
  control the tilting of the mounting such that the mounting is always maintained in a substantially level (horizontal) orientation or such other orientation as may be preselected.

Preferably, the CPU may also be programmed to determine the slope angle and/or orientation of the mounting being to be preferably maintained according to the slope angle and/or orientation of the chassis of the vehicle and control the tilting of the mounting such that the mounting is always maintained in a substantially level (horizontal) orientation or such slope angle and orientation as may be pre-selected or pre-programmed.

In such situations the CPU may:
a) reduce the rate (speed) of tilting;
b) issue a warning to a vehicle operator via a display apparatus or other suitable peripheral device;
c) stop the tilting when the predetermined maximum tilt of the mounting relative to the chassis has been reached.

In most preferred embodiments the CPU may also be programmed to indicate on a graphic display apparatus the gradient of the slope on which the excavator is operating as well as indicate the relative orientation of the cab of the excavator.

In some preferred embodiments for tilt apparatus where the degree of tilt as between the mounting and the chassis is substantially the same or close to, the maximum gradient on which the vehicle can operate, in addition to a warning the CPU may also be programmed to stop the vehicle itself from moving forward if the predicted slope has a dangerously steep gradient.

The word 'tilt' or grammatical variants thereof as used herein refers to changing the angle of the mounting relative to the support frame/chassis.

The word 'chassis' as used herein refers to the chassis of the vehicle to which the tilt apparatus is attached, or is to be attached.

In preferred embodiments where the actuators are hydraulic rams the CPU controls the tilting of the mounting by directing the flow of hydraulic fluid to the appropriate actuators as required to maintain the mounting in a level position as assessed from the sensor information.

In preferred embodiments the CPU may slow the rate of tilting or stop tilting as a vehicle approaches the maximum gradient to which it can automatically level the cab by reducing or stopping the flow of hydraulic fluid to the actuators (rams).

In other embodiments where the actuators are in other forms the CPU may control the tilting in a similar manner although by other means as would be apparent to one skilled in the art.

The inclination sensors and solenoid valves may be capable of communication with the CPU located in the cab of the vehicle. In some preferred embodiments this communication may be achieved via radio-waves. This thereby avoids rotation of the cab about the slew bearing twisting any wires which would otherwise connect these devices with the CPU in the cab.

In preferred embodiments where the CPU communicates with the sensors and/or solenoid valves wires these may be routed through the central region of the tilt apparatus to avoid tangling and to allow for continuous rotation of the cab.

The term 'continual' as used herein refers to either continuous real time communication, or regular communication at predetermined time intervals. It is envisaged that the occurrence of the regular communication may be either pre-set or alternately, the intervals may be varied according to the speed, or average speed, at which the vehicle to which the tilt apparatus is attached is moving.

In preferred embodiments the sensors provide continuous information to the CPU.

Thus preferred embodiments of the present invention may have a number of advantages over the prior art, which can include:
  providing a substantially real time display of the slope on which excavator is operating whilst in transit;
  the ability to automatically level the cab of a vehicle whilst the excavator is in transit;
  the reduced risk of mechanical failure due to uncontrolled tilting whilst the vehicle is in transit;
  the ability to detect when the vehicle is on, or approaching, a slope having a dangerously steep gradient.

BRIEF DESCRIPTION OF DRAWINGS

Further aspects of present invention will become apparent from the following description which is given by way of example only and with reference to the accompanying drawing in which.

BEST MODES FOR CARRYING OUT THE INVENTION

Figure 1:
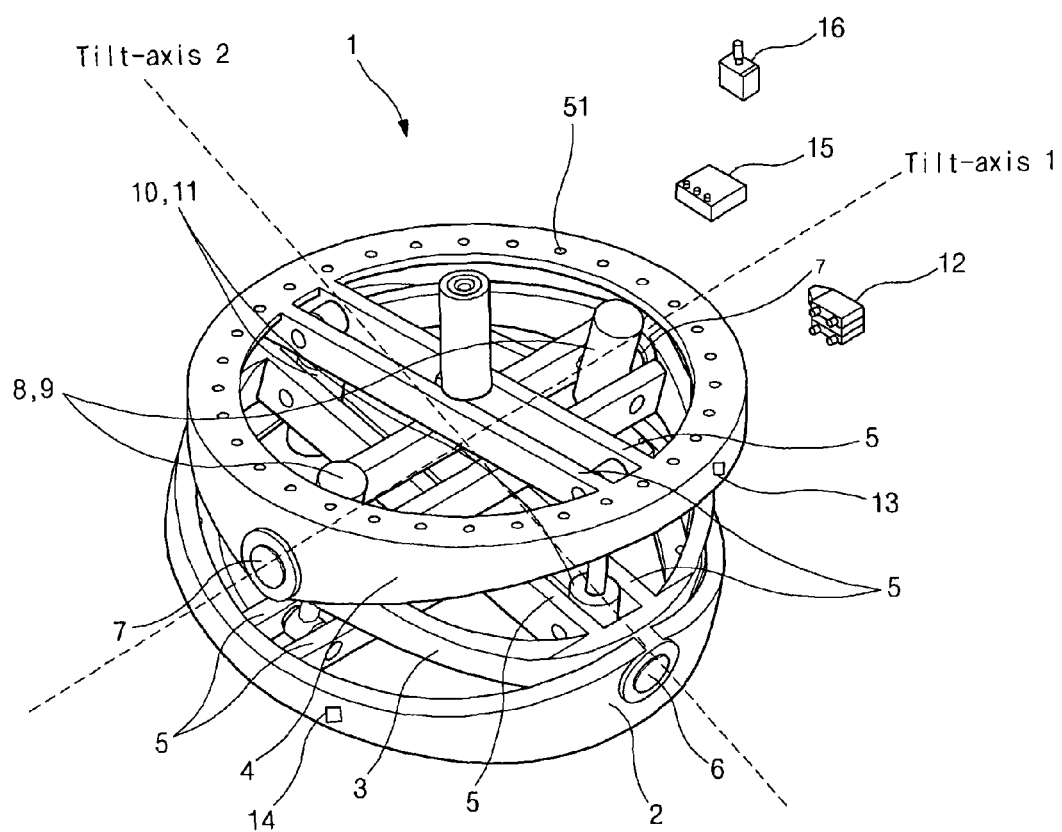
FIG. 1 shows a perspective view of a tilt apparatus according to one preferred embodiment of the present invention.

With respect to the drawings there is provided a tilt apparatus generally indicated by arrow 1. The tilt apparatus 1 has a support frame 2, a tilt frame 3 and a mounting 4. The support frame 2, tilt frame 3 and mounting 4 each have a pair of cross struts 5. The mounting 4 is secured to a slew bearing (not shown) via a plurality of bolt apertures 51 which correspond to the bolt aperture pattern on the slew bearing to allow for attachment of the mounting 4 to a vehicle's cab (not shown). In a similar manner the support frame 2 also has a plurality of bolt apertures (not shown) which match those on a vehicle's track chassis (not shown).

Though not shown, in case that a tilt apparatus 1 may have not the tilt frame 3, the support frame and the mounting may be hinge-connected in a ball-type hinge or there is a supporting ball between them.

The support frame 2 is pivotally attached at point 6 to the tilt frame 3 to allow the tilt frame 3 to pivot along the second horizontal pivot-axis 2.

The mounting 4 is pivotally attached at point 7 to the tilt frame 3 to allow the mounting to pivot along the first horizontal pivot tilt-axis 1.

The mounting 4 may effectively be tilted about the first horizontal pivot axis 1 and the second horizontal pivot axis 2 via the operation of hydraulic rams 8,9,10 and 11. Thus, tilting of the mounting about the first horizontal pivot axis 1 may be achieved via the cooperative movement of rams 10 and 11, and about the second horizontal pivot axis 2 via rams 8 and 9.

The hydraulic rams 8, 9, 10 and 11 are:
  all connected to the tilt frame 3 at one end thereof;
  connected to the struts 5 of the mounting 4 in the case of rams 10 and 11; and
  connected to the struts 5 of the support frame 2 in the case of rams 8 and 9.

Not shown, the hydraulic rams all may be connected between the mounting and the support frame.

All connections of the hydraulic rams are preferably hinge-connected.

In embodiment where the present invention is applied to a 20 tonne excavator, the inventor envisages suitably sized hydraulic rams being utilized to control tilting of the tilt apparatus 1 about its axes.

The two slice hydraulic valve 12 becomes activated after top inclination sensors 13 (of which only one is shown), on the mounting 4 and bottom inclination sensors 14 (of which only one is shown) on the support frame 2 relay information to a CPU 15 (not shown) located in the cab of a vehicle (not shown).

The two slice hydraulic valve 12 can also be controlled in a manual override situation via a manual joy stick controller 16 located in the vehicle cab.

Data cables 17 and 18 running from he top inclination sensors 13 and the bottom inclination sensors 14 travel up and through the tilt apparatus to the cab of a vehicle via means of a distributor centre joint 19. The distributor centre 19 extends through the tilt apparatus and also houses hydraulic lines 20, 21, 22 and 23 which connect hydraulic rams 10, 11, and 8 and 9 to the hydraulic slice valve 12.

Electrical power is supplied from the vehicle itself from a power source 25 to the joy stick 16, CPU 15 and two slice hydraulic valve 12 and sensors 13 and 14 via wires (not shown).

Similarly, hydraulic fluid is supplied from the vehicle itself from a fluid source (not shown) via supply hydraulic lines 60, 61 which are connected to the two slice hydraulic valve 12.

The joy stick 16 and CPU 15 are connected to the sensors and two slice hydraulic valve data and power cables (not shown). The CPU 15 is also connected to a display apparatus (not shown) in the cab of a vehicle via data and power cables (not shown). The CPU 15 relays information to the display apparatus which then indicates the inclination of the track chassis along the longitudinal and transverse axes and the relative position of the vehicle cab.

In normal operation, the CPU 15 controls the oil being sent to the hydraulic ram pairs 8, 9 and 10, 11 so as to raise or lower the angle of the mounting 4 with respect to the support frame 2. The CPU 15 also relays information about the amount of tilt of the support frame 2 relative to the mount 4 to the graphic display apparatus.

Figure 2:
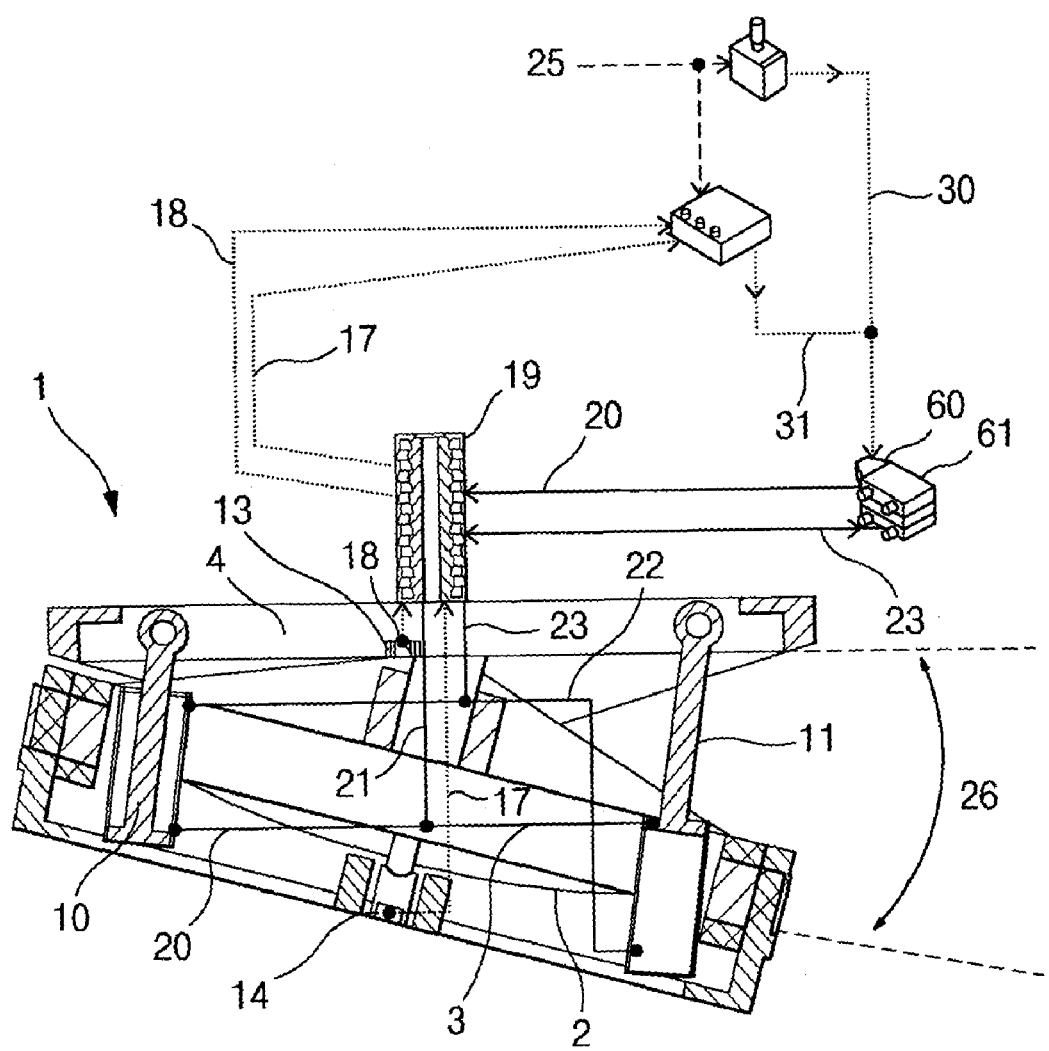
FIG. 2 is a schematic cross sectional side view of the ti apparatus showing a preferred arrangement of the components in FIG. 1.

When the maximum angle as shown by double headed arrow 26 as between the mounting 4 and support frame 2 is being approached as is shown in FIG. 2 the CPU 15 controls the two slice hydraulic valve 12 so as to reduce the rate of hydraulic fluid being supplied to the rams.

In this manner, the tilt apparatus 1 of the present invention is able automatically to level (on gradients where this is possible) the cab of vehicle (not shown) whilst the vehicle is in transit. The ability to detect the maximum tilt angle 26 between the support frame 2 and mounting 4 and then specifying a corresponding reduction in the supply of hydraulic fluid to the rams 8, 9 and 10, 11 ensures that the rams do not come to a crashing halt when they reach their maximum stroke limit.

Accordingly, the present invention is able to automatically level the cab of a vehicle whilst in transit with minimal risk of jarring caused by over extension of the hydraulic rams 8, 9 and 10, 11 leading to mechanical failure of the tilt apparatus 1.

Aspects of the present invention have been described by way of example only and it should be appreciated that modifications and additions may be made thereto without departing from the scope thereof.

What is claimed is:

1. A tilt apparatus for a cab of a vehicle, comprising:
    a support frame attached to a chassis of the vehicle and connected with a tilt frame, the horizontal plane of said support frame being parallel to that of said chassis;
    a mounting attached to said cab and connected with said tilt frame, and configured so that the horizontal plane of said mounting can tilt about any direction of said chassis;
    actuators comprising at least one top actuator having one end connected with said support frame and the other end connected with said tilt frame and at least one bottom actuator having one end connected with said tilt frame and the other end connected with said mounting;
    at least two inclination sensors comprising at least one top sensor installed on said mounting and at least one bottom sensor installed on said support frame or said chassis; and
    a CPU installed in said cab and receiving continual slope information from said top and bottom sensors and controlling the operation of said actuators on the basis of said continual slope information and the relative tilted angle information between the horizontal plane of said mounting and that of said support frame or chassis,
    wherein each of said mounting and said support frame is a ring-shaped frame when viewed in plan view and comprises at least one cross strut.

2. A tilt apparatus according to claim 1, wherein said mounting has a rotatable joint member and said cab is attached to said rotatable joint member and can rotate with respect to said chassis.

3. A tilt apparatus according to claim 1, wherein said mounting swings at the first horizontal pivot axis passed through said tilt frame and said tilt frame swings at the second horizontal pivot axis passed through said support frame, and wherein said two horizontal pivot axes are perpendicular to each other when viewed in plane view.

4. A tilt apparatus according to claim 1, wherein said tilt frame is substantially ring-shaped frame when viewed in plan view, and wherein said tilt frame shapes a U-type or concave-curve figure of which both end sides widen outwardly when said tilt frame viewed in front view, and shapes reversely when viewed in left or right view.

5. A tilt apparatus according to claim 1, wherein said mounting has a center distribution joint member attached to the upper part of said mounting and connected with a hole of a lower part of said cab, and wherein cables connected between said top and bottom sensors and said CPU and lines connected to said actuators pass through said center distribution joint member.

6. A tilt apparatus according to claim 1, wherein said actuators are two pairs respectively located oppositely at the longitudinal and transverse axes of said vehicle, and wherein when the one of each pair of said actuators pushes one side of said mounting the other pulls the opposite side of it at the same time.

7. A tilt apparatus according to claim 1, wherein said actuators are hydraulic rams, pneumatic rams or motor assemblies.

8. A tilt apparatus according to claim 1, wherein said top and bottom sensors comprise at least one two-axis inclination sensor, respectively.

9. A tilt apparatus according to claim 1, wherein said actuators are two pairs respectively located oppositely at the longitudinal and transverse axes of said vehicle, and wherein when the one of each pair of said actuators pushes one side of said mounting and other pulls the opposite side of it at the same time.

10. A tilt apparatus according to claim 1, wherein said sensors are liquid filled or solid state sensors.

11. A tilt apparatus according to claim 1, wherein said CPU is connected to a graphic display apparatus located in the driving booth of said cab.

12. A tilt apparatus according to claim 1, wherein said construction vehicle is an excavator.

* * * * *

UNITED STATES PATENT AND TRADEMARK OFFICE
CERTIFICATE OF CORRECTION

| | | |
|---|---|---|
| PATENT NO. | : 8,028,783 B2 | Page 1 of 1 |
| APPLICATION NO. | : 12/375228 | |
| DATED | : October 4, 2011 | |
| INVENTOR(S) | : Felix Edward Joseph Rust | |

It is certified that error appears in the above-identified patent and that said Letters Patent is hereby corrected as shown below:

Title Page, item (60):

Please insert --Related U.S. Application Data

Provisional Application No. 60/834,428, filed on July 31, 2006.--

Signed and Sealed this
Seventeenth Day of January, 2012

David J. Kappos
*Director of the United States Patent and Trademark Office*